United States Patent
Hum

[19]

[11] Patent Number: 6,078,992
[45] Date of Patent: Jun. 20, 2000

US006078992A

[54] DIRTY LINE CACHE

[75] Inventor: Herbert H. J. Hum, Portland, Oreg.

[73] Assignee: Intel Corporation, Santa Clara, Calif.

[21] Appl. No.: 08/985,772

[22] Filed: Dec. 5, 1997

[51] Int. Cl.[7] .................................................... G06F 12/08
[52] U.S. Cl. ...................... 711/122; 711/120; 711/143; 711/142; 711/128
[58] Field of Search ..................... 711/122, 120, 711/143, 128, 142, 108; 710/39; 365/49

[56] References Cited

U.S. PATENT DOCUMENTS

| | | | |
|---|---|---|---|
| 4,819,154 | 4/1989 | Stiffler et al. | 714/20 |
| 5,197,144 | 3/1993 | Edenfield et al. | 711/143 |
| 5,261,066 | 11/1993 | Jouppi et al. | |
| 5,261,074 | 11/1993 | Solomon et al. | 710/100 |
| 5,317,718 | 5/1994 | Jouppi | |
| 5,526,510 | 6/1996 | Akkary et al. | |
| 5,537,575 | 7/1996 | Foley et al. | |
| 5,551,001 | 8/1996 | Cohen et al. | 711/122 |
| 5,564,035 | 10/1996 | Lai | |
| 5,577,227 | 11/1996 | Finnell et al. | |
| 5,581,729 | 12/1996 | Nishtala et al. | |
| 5,642,494 | 6/1997 | Wang et al. | |
| 5,649,154 | 7/1997 | Kumar et al. | |
| 5,696,938 | 12/1997 | Cassetti et al. | 711/143 |
| 5,708,792 | 1/1998 | Hayes et al. | 711/108 |
| 5,802,562 | 9/1998 | Kahle | 711/122 |
| 5,835,945 | 11/1998 | King et al. | 711/120 |

OTHER PUBLICATIONS

Kevin B. Theobald, Herbert H.J. Hum and Guang R. Gao, "A Design Framework for Hybrid–Access Caches," 1st IEEE Int'l Symposium on High Performance Computer Architecture, 1st HPCA '95, North Carolina, 1995.

Norman P. Jouppi, "Improving Direct–Mapped Cache Performance by the Addition of a Small Fully–Associative Cache and Prefetch Buffers," IEEE, 17 International Symposium on Computer Architecture, CH2887–8/90/0000/0364$01.00, 1990, pp. 364–373.

*Primary Examiner*—Hiep T. Nguyen
*Attorney, Agent, or Firm*—Blakely, Sokoloff, Taylor & Zafman LLP

[57] ABSTRACT

A technique for providing a dirty line cache to supplement a cache memory, in order to improve caching performance for a processor in a computer system. A fully-associative cache memory is coupled to operate with a main cache memory at a particular level of the cache hierarchy. The supplemental cache is termed as a dirty line cache, since it only stores dirty cache lines. In the preferred embodiment, the dirty line cache is implemented in a write-out buffer of a write-back or write-through cache.

22 Claims, 11 Drawing Sheets

DIRTY LINE CACHE

BACKGROUND OF THE INVENTION

1. Field of the Invention

The present invention relates to the field of processors and, more particularly, to a technique for utilizing cache memory.

2. Background of the Related Art

The use of a cache memory with a processor is well known in the computer art. A primary purpose of utilizing cache memory is to bring the data closer to the processor in order for the processor to operate on the data more efficiently. It is generally understood that memory devices closer to the processor operate faster than memory devices farther away on the data path from the processor. However, there is a cost trade-off in utilizing faster memory devices. The faster the data access, the higher the cost to store a bit of data. Accordingly, a cache memory tends to be much smaller in storage capacity than main memory, but is faster in accessing the data.

A computer system may utilize one or more levels of cache memory and allocation and de-allocation schemes implemented for the cache for various known computer systems are generally similar in practice. That is, data that is required by the processor is cached in the cache memory (or memories). If a miss occurs, then an allocation is made at the entry indexed by the access. The access can be for loading data to the processor (also known as a read operation) or storing data from the processor to memory (also known as a write operation). When the miss occurs at a given cache level, a lower level cache memory (typically the next lower level) or main memory is accessed to retrieve the required data. The cached information is retained by the cache memory until it is no longer needed, made invalid or replaced by other data, in which instances the cache entry is de-allocated.

One notable aspect of cache memory management pertains to the efficient utilization of the cache to obtain a high ratio of "hits" to "misses" (thereby minimizing the number of misses). Since a cache miss results in additional time to retrieve the data into the cache, processing cycle time can be lost waiting for this data to arrive. As processor speeds increase, the memory system, which includes the cache memory hierarchy, will also need to improve its performance so as not to impede processor performance.

One practice for improving cache memory performance has been the use of a separate miss cache to supplement the main cache memory. For example, a level one (L1) cache may employ a direct-mapping technique to provide the fastest accessing speed. However, direct-mapping can result in a high number of cache misses. Accordingly, a supplemental fully-associative cache is utilized along with the L1 cache to improve the cache performance.

For example, U.S. Pat. No. 5,261,066 (Jouppi et al.) describes the use of a small fully-associative "victim cache" which is loaded with the victim line from the direct-mapped L1 cache. As the cache lines are replaced in the L1 cache, the evicted lines are then stored in the victim cache. According to Jouppi et al., victim caching is an improvement over miss caching.

The present invention also provides for improving the cache performance at a cache level, which improves the overall system performance for caching information in a computer system.

SUMMARY OF THE INVENTION

The present invention describes a technique for providing a dirty line cache to supplement a cache memory, in order to improve caching performance for a processor in a computer system. A fully-associative cache memory is coupled to operate with a main cache memory at a particular level of the cache hierarchy. The supplemental cache is termed as a dirty line cache, since it only stores dirty (modified) cache lines.

Generally, the dirty line cache is coupled to a L1 cache for receiving cache lines from the L1 cache which have been modified. Since modified cache lines need to be propagated down the cache hierarchy to write the modified data to appropriate memory locations holding the original data, these lines can now be captured by the dirty line cache. Caching of dirty lines decreases the utilization of the bus between the levels of cache and increases the chance for a cache hit closer to the processor.

The dirty line cache can be utilized in both write-back and write-through caches. The preferred embodiment implements the dirty line cache in a write-out buffer of a cache memory. Since the write-out buffer already exists to propagate cached data down the hierarchy, a behavioral modification of the write-out buffer will permit it to be adapted for providing the dirty line cache function.

DETAILED DESCRIPTION OF THE PREFERRED EMBODIMENTS

A technique for providing a dirty line cache to improve overall cache performance is described. In the following description, numerous specific details are set forth, such as specific cache memories and structures, flow diagrams, and example operations, etc., in order to provide a thorough understanding of the present invention. However, it will be appreciated by one skilled in the art that the present invention may be practiced without these specific details. In other instances, well known techniques and structures have not been described in detail in order not to obscure the present invention.

Figure 1:
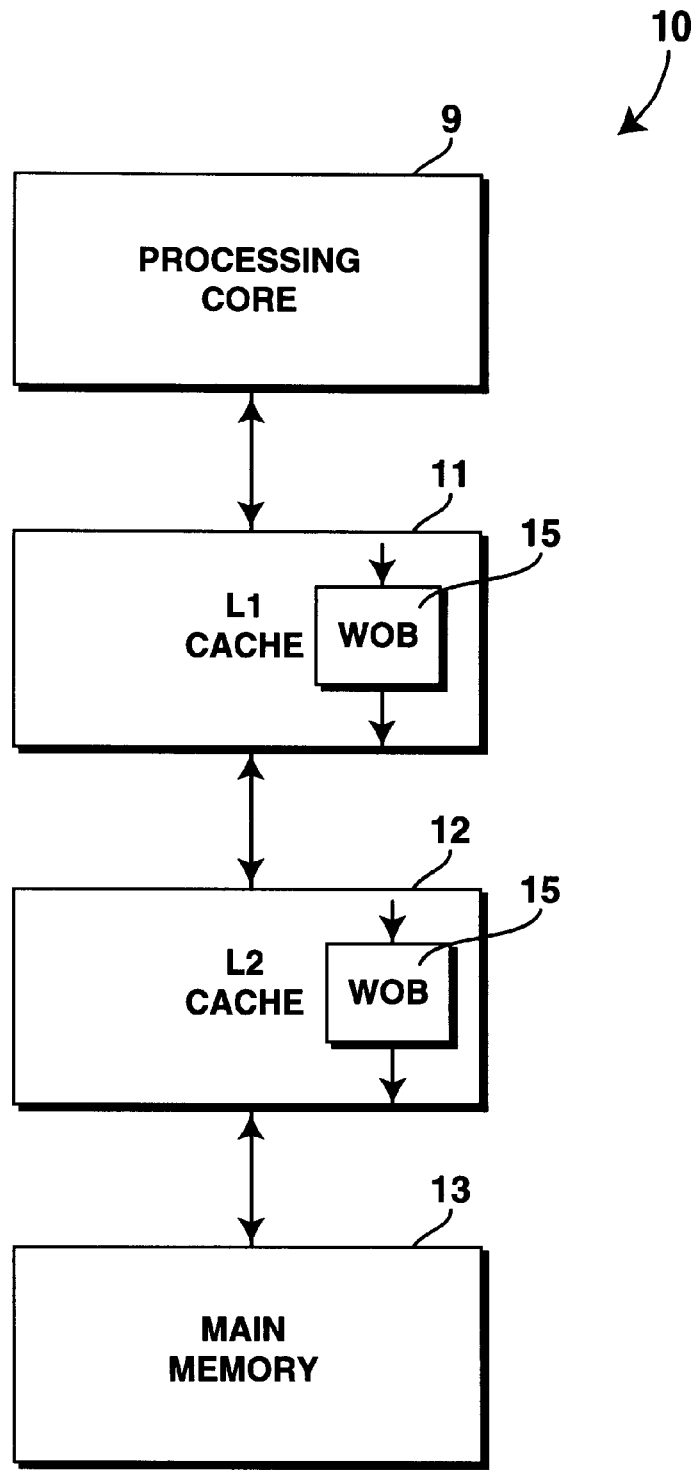
FIG. 1 shows a two-level cache memory arrangement known in the art.

Referring to FIG. 1, an example of a cache memory system 10 currently in general practice is illustrated. The particular cache memory system 10 is a hierarchical cache system having two cache levels. In a typical hierarchical cache arrangement, a plurality of cache memories are arranged in levels, with the level closest to the processor labeled as Li. Subsequent lower levels of cache are respectively labeled L(i+1). In FIG. 1, the exemplary system 10 is shown having two levels of cache 11 and 12, wherein the level 1 (L1) cache 11 is closest to a processing core 9. The level 2 (L2) cache 12 resides at the next level, which is farther away from the processor, in data processing terms. A memory 13 is then coupled to the L2 cache. Memory 13 can be of one of a variety of memory devices, but generally in the current processing environment, memory 13 is a main memory of a computer system. Memory 13 is also referred to as RAM, since random-access-memory (RAM) memory devices generally are used as the main memory in a computer system. Although not shown, it is to be noted that other memories (such as magnetic or optical media), peripherals, modems, networks, as well as information routed through the Internet can be coupled to the computer system for information transfer to and from memory 13.

In current practice, the L1 cache is resident physically close to the processing core and is typically resident on the processor chip itself. The L2 cache can also be on-chip or reside on a separate wafer. The actual placement of the various cache memories is not critical to the practice or understanding of the present invention. Furthermore, only two levels of cache are shown in the example, however, it is to be noted that additional levels of cache memories can be present. Current practice is to have one, two or three (L1,L2,L3) levels of cache memories in a computer system.

The cache memory system of FIG. 1 generally operates as a write-back cache or as a write-through cache. The concept and operation of write-back and write-through catches are known in the art. Further, a cache memory typically has a write-out-buffer (WOB) 15 associated with it, so that writes back down the hierarchy are processed by the WOBs 15. That is, when the processing core 9 initiates a write to memory 13, the write updates the appropriate cache line in the L1 cache (if there is a hit) and then the updated information is written into the L1 WOB. The WOB retains the updated information until a transfer can be executed to propagate the information down the hierarchy. By using this scheme, the L1 cache is released once the updated information is loaded into the WOB for later propagation to write to other memory devices (whether cache or RAM) down the hierarchy.

Also, in practice, it is generally preferable to utilize direct-mapped or low set-associative cache for the L1 cache. As noted, the performance gain achieved by using a direct-mapped cache can result in a number of misses. In order to improve performance to reduce the number of misses at the L1 level, a victim cache can be utilized. The use and operation of a victim cache are described in the aforementioned U.S. Pat. No. 5,261,066. An exemplary cache system 20, illustrating the use of a fully-associative victim cache 21 at the L1 level, is also shown in FIG. 2.

Figure 2:
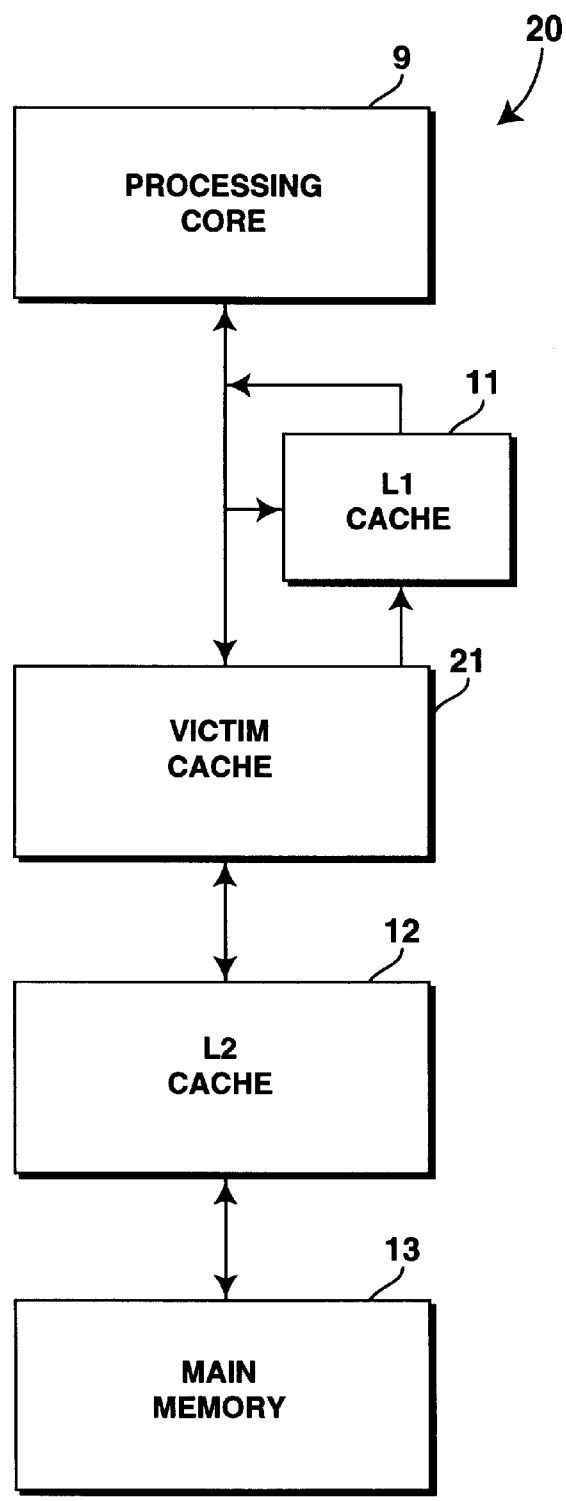
FIG. 2 shows a two-level cache memory arrangement which uses a victim cache known in the art.

In FIG. 2, the cache hierarchy of FIG. 1 is shown, but with the utilization of the victim cache 21. The victim cache 21 resides at the L1 level, but is not in the critical path for information (data and/or instruction) transfer between the processing core 9 and the main memory 13. The victim cache 21 is loaded with the victim line from the L1 cache 11, which is a direct-mapped cache. The victim line is the cache line in the L1 cache which has been victimized (or replaced) by a new entry into the L1 cache. With victim caching, no cache line appears both in the L1 cache 11 and the victim cache 21. In the event of a cache miss to the L1 cache that hits in the victim cache 21, the contents of the L1 cache line and the matching victim cache line are swapped. The victim cache essentially provides additional caching ability at the L1 level, but this is done outside of the critical data path. The utilization of a victim cache requires a secondary cache structure in addition to the direct-mapped cache structure already present. That is, for a given level of cache hierarchy implementing a victim cache, two separate cache memories are required.

Figure 3:
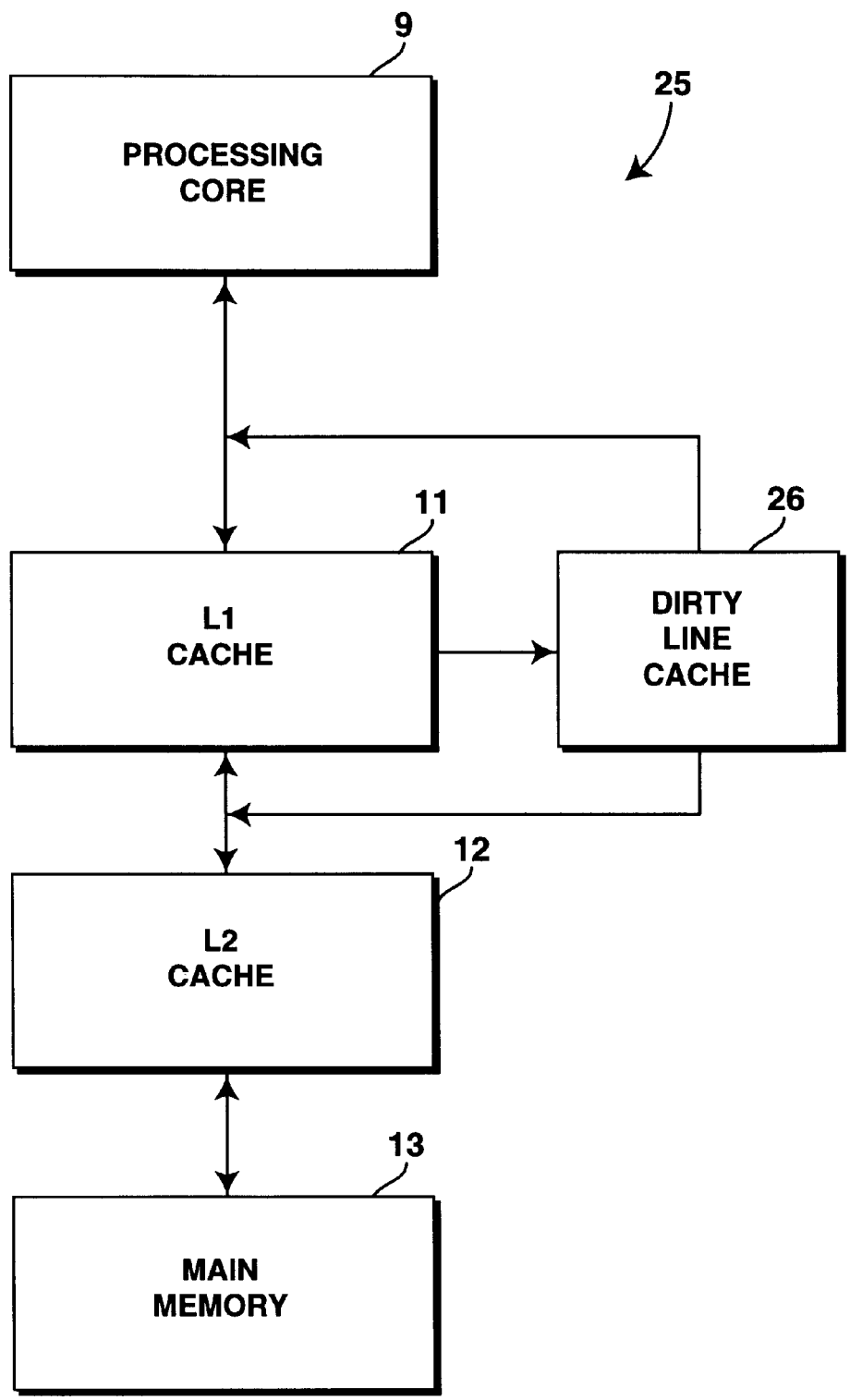
FIG. 3 shows a two-level cache memory arrangement which uses a dirty line cache of the present invention.

Referring to FIG. 3, a cache memory system 25 implementing a "dirty line" cache 26 of the present invention is illustrated. System 25 is equivalent to the system 10 of FIG. 1, but with the addition of the dirty line cache 26. The term "dirty line" is used to describe the present invention, since the cache 26 only stores cache lines which have been modified (the "dirty line"). The dirty line cache 26 of the present invention can be constructed as a separate cache device or it can be an integrated structure which provides the cache functionality. As will be described in reference to FIG. 10, the preferred embodiment adapts the write-out-buffer (WOB) of the standard cache to perform the dirty line cache function.

In FIG. 3, the processing core 9 is coupled to the L1 cache 11, which is usually direct-mapped or is low set-associative (for example, 2-way set associative). The dirty line cache 26 is associative and preferably a fully-associative cache. The L2 cache and the main memory 13 are coupled lower on the hierarchy and the operation of these units have been previously described. The dirty line cache 26 operates as a supplemental cache with the L1 cache in the particular example. Since the bulk of the critical cache misses will occur at the first level, providing a supplemental cache at this level will substantially improve processing performance. However, the dirty line cache can be used at any level or at several levels, if desired. Again, the optimum improvement in performance is achieved by utilizing the scheme of a dirty line cache at the L1 level.

The dirty line cache 26 may at first appear similar to the victim cache of FIG. 2, however, the two are different. The dirty line cache functions as a supplemental cache to receive only modified cache lines ("dirty lines") from the L1 cache. Unmodified (or clean) cache lines are never stored in the dirty line cache 26. In the preferred embodiment, it is desirable that all dirty lines from the L1 cache propagate through the dirty line cache before traversing to a lower level of the hierarchy. A typical format of the information content stored in both the main L1 cache 11 and its supplemental dirty line cache 26 is shown in FIG. 4.

Figure 4:
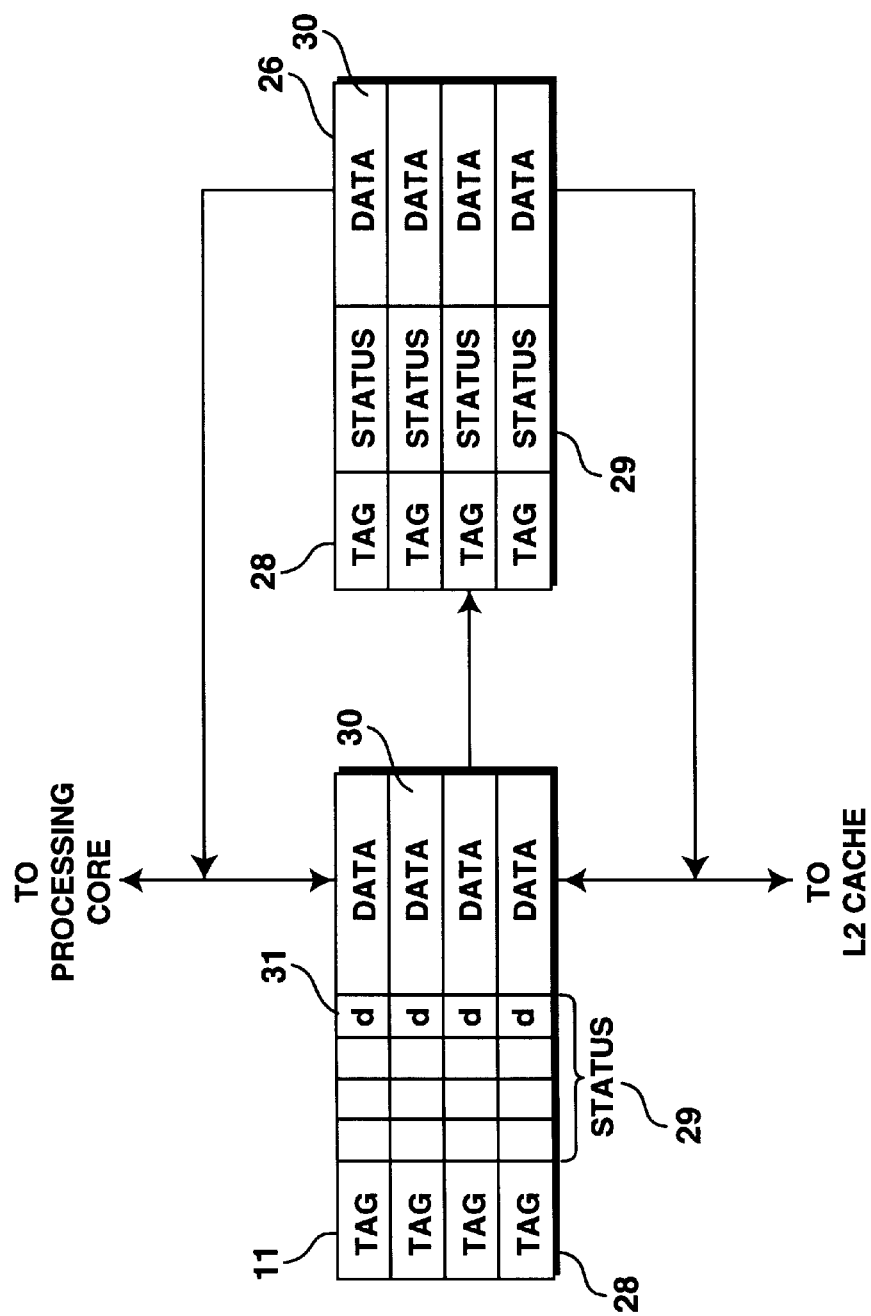
FIG. 4 shows a standard cache memory and its supplemental cache memory provided by the dirty line cache of the present invention, in which only the dirty lines are stored in the dirty line cache.

In FIG. 4, the L1 cache 11 is shown having one or more cache lines stored (resident) therein. A cache line typically includes an address tag 28, one or more status bit(s) 29, and a defined number of information bytes (shown as "data" 30 in the Figure). Although shown as data, the cache content could be either data or instruction. One of the status bits is used as a "dirty" ("d") bit 31, so that when the data field associated with the cache line has been modified, the status bit is set to indicate that the data is dirty. That is, the data has been modified and further processing steps are needed to propagate the modified data down the hierarchy to change the corresponding data in the main memory.

The dirty line cache 26 of the present invention contains only those cache lines which have the dirty bit 31 set in cache 11. In operation, the dirty lines which are being propagated from the L1 cache to the lower levels of the hierarchy are first routed to the dirty line cache 26. In the preferred embodiment, the dirty lines from a standard cache are always routed through an associated dirty line cache, if there is one at that level. Accordingly, the dirty line cache 26 will only store cache lines with modified data, but the standard (or main) cache 11 can contain both modified and unmodified data. Thus, the cache lines stored in the L1 cache and the dirty line cache are not necessarily exclusive.

Operations of the dirty line (DL) cache 26 are described below and illustrated in the flow diagrams of FIGS. 5–9. Typically, the use of a DL cache is more beneficial with a write-through cache than a write-back cache. However, an implementation with a write-back cache is also described, since the present invention can be utilized with a write-back cache as well. In the diagrams, cache levels are noted as L1 and L(i+1), but are discussed in terms of L1 and L2 in the description below.

Figure 5:
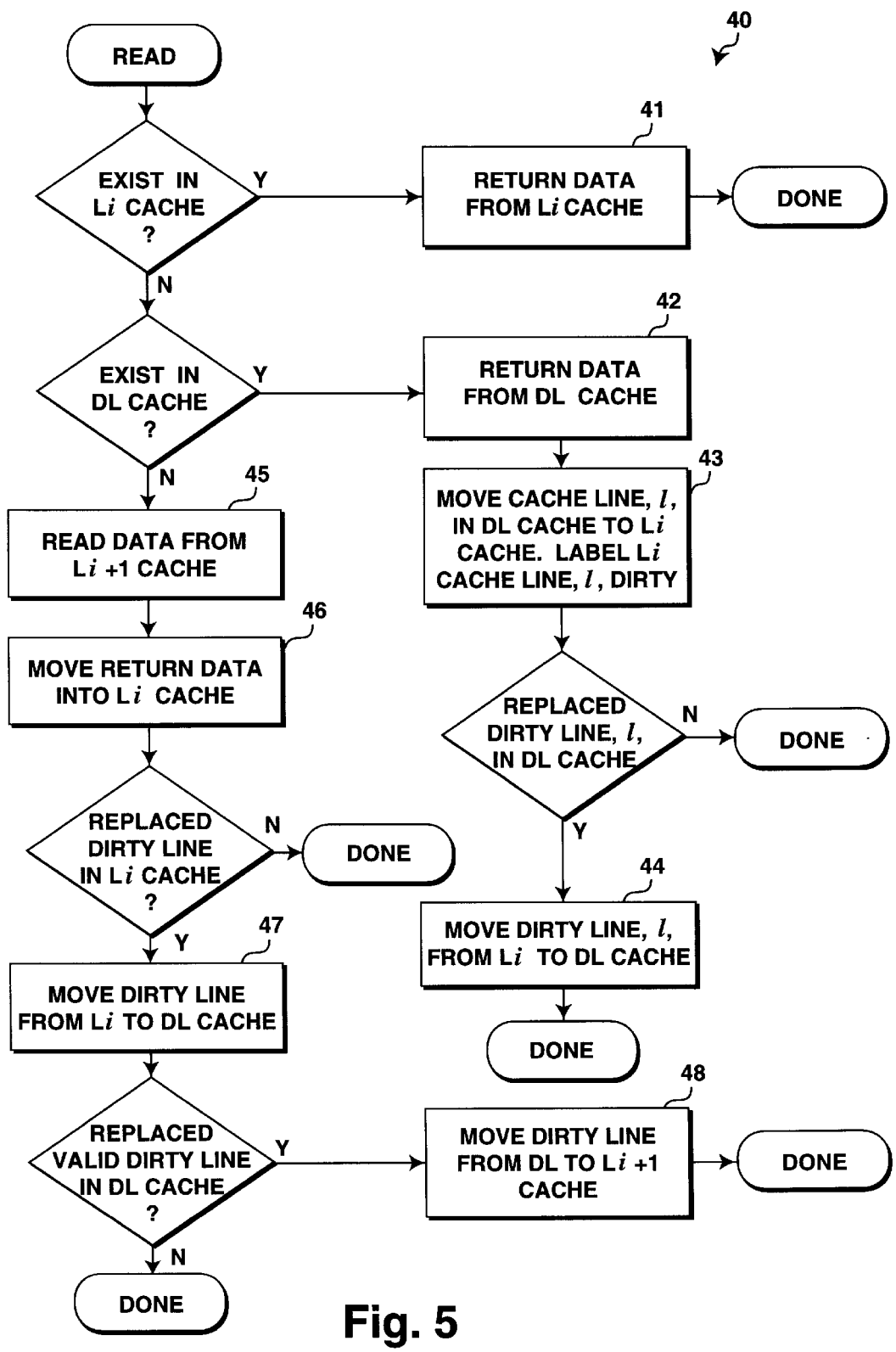
FIG. 5 shows a flow diagram for a read issued to a write-back cache utilizing the dirty line cache of the present invention.

Referring to FIG. 5, a flow diagram 40 shows the operative sequence for issuing a read from the processing core (hereinafter simply referred to as the processor). The read instruction initiates a sequence of operations for fetching a particular data (or instruction). The L1 cache is accessed to check if the appropriate tag resides within the L1 cache. If the data is present, then the data is read from the L1 cache (as shown by block 41). If the data is not present in the L1 cache, the DL cache is checked. The data is read from the DL cache if it is present (block 42). Note that although the flow diagram 40 shows the accesses sequentially, it is appreciated that both the L1 and DL caches can be accessed simultaneously.

If the data is read from the DL cache and not from the L1 cache, the DL cache line must now be moved into the L1 cache so that the information is now available in the L1 cache. The moved cache line must have its dirty bit set so that the line is treated as a dirty line in the L1 cache (block 43).

If the cache line replaced in the L1 cache is also a dirty line, then this replaced line is moved to the DL cache (block 44) to complete the read sequence. If the replaced line in the L1 cache is not dirty, then it can be replaced without any further action and the read sequence is done. It is reiterated that for proper operation of the DL cache of the preferred embodiment, all dirty lines in the L1 cache must be sent to the DL cache for propagation to the lower levels in normal usage of the cache. It is appreciated that there are special software commands which flush the entire cache to main memory. In those cases, the dirty lines can bypass the DL cache and go straight to main memory. But again, these are exceptions to the normal function of the cache.

Returning to the beginning of the diagram, if the data is not present in both the L1 and the DL caches, the data is read from a device lower on the hierarchy, such as the L2 cache (block 45). The data is sent back up the hierarchy and stored in the L1 cache (block 46). Again, if the L1 cache line being replaced is dirty, it is moved to the DL cache (block 47). Otherwise the read sequence is completed. If the moved dirty line from the L1 cache replaces a valid line waiting for propagation in the DL cache, then this replaced DL cache line must be propagated to a lower level of the hierarchy before the read sequence can be completed (block 48).

Figure 6:
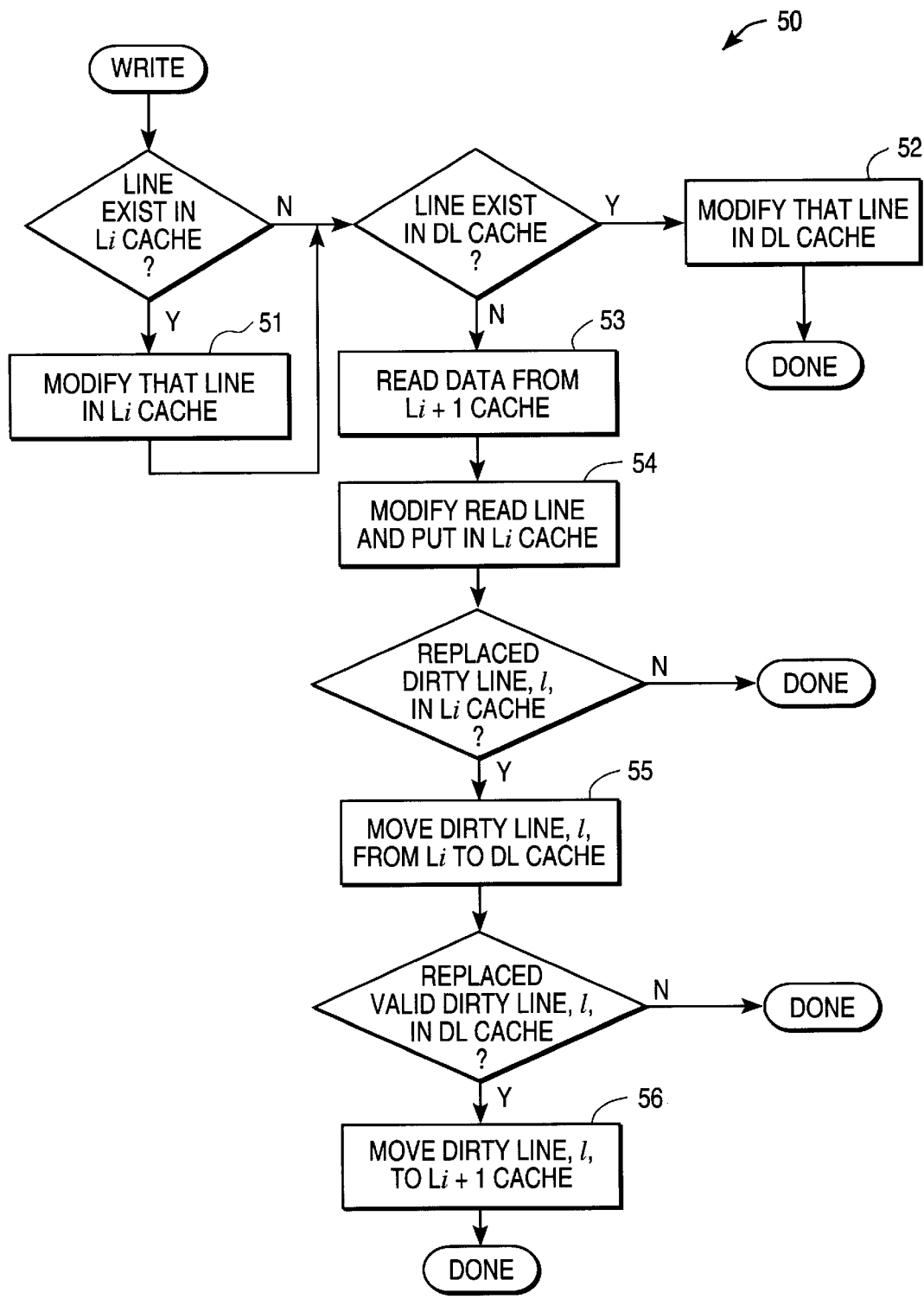
FIG. 6 shows a flow diagram for a write issued to a write-back cache utilizing the dirty line cache of the present invention.

Referring to FIG. 6, a flow diagram 50 shows the operative sequence for issuing a write from the processor. If the cache line pertaining to the write operation already exists in the L1 cache, then that line is modified with the new information being written (block 51). The DL cache is also checked and the cache line modified if present (block 52). Again, both steps can be performed sequentially or at the same time.

If the data is not present in both the L1 and DL caches, a lower level of the hierarchy is accessed to bring the data to the present level (block 53). The read data is modified with the current data and placed in the L1 cache (block 54) for future reference, If the line it replaces in the L1 cache is dirty, then that dirty line is moved to the DL cache (block 55). Otherwise the write sequence is completed. If the moved dirty line from the L1 cache replaces a valid line in the DL cache waiting for propagation, then this replaced DL cache line must be propagated to a lower level of the hierarchy before the sequence can be completed (block 56). Otherwise the write sequence is completed.

Figure 7:
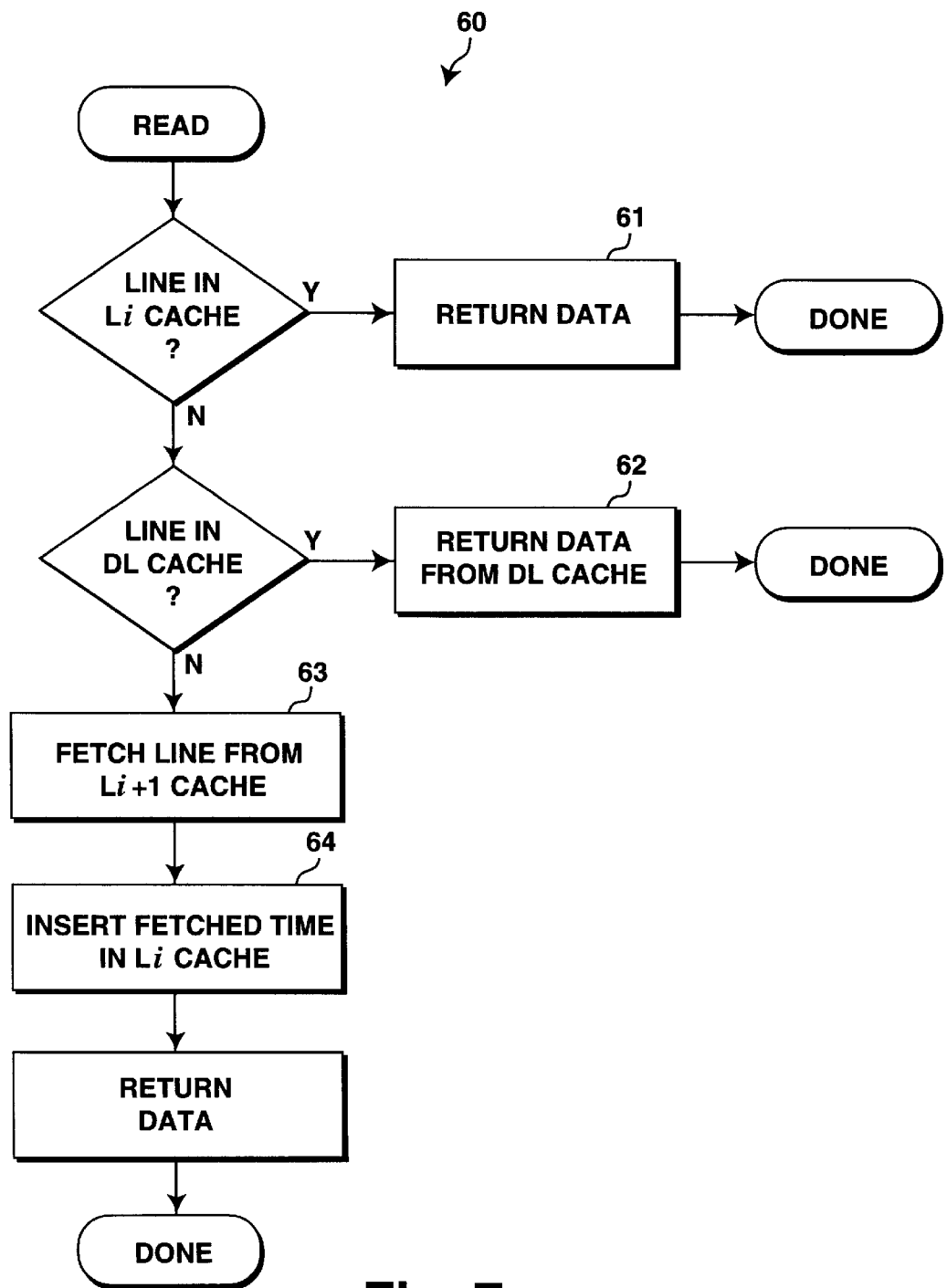
FIG. 7 shows a flow diagram for a read issued to a write-through cache utilizing the dirty line cache of the present invention.
Figure 8:
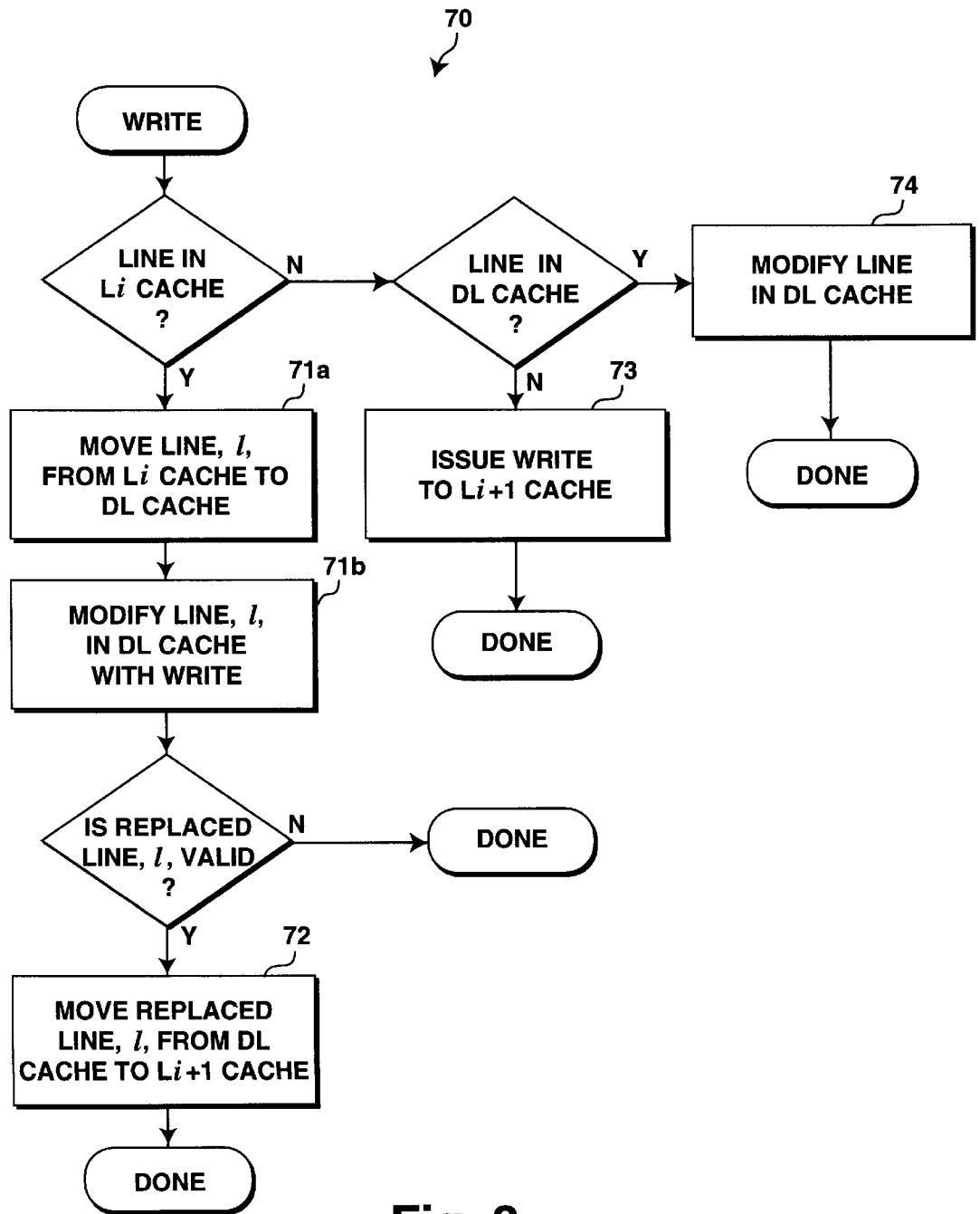
FIG. 8 shows a flow diagram for a write issued to a write-through cache utilizing the dirty line cache of the present invention.
Figure 9:
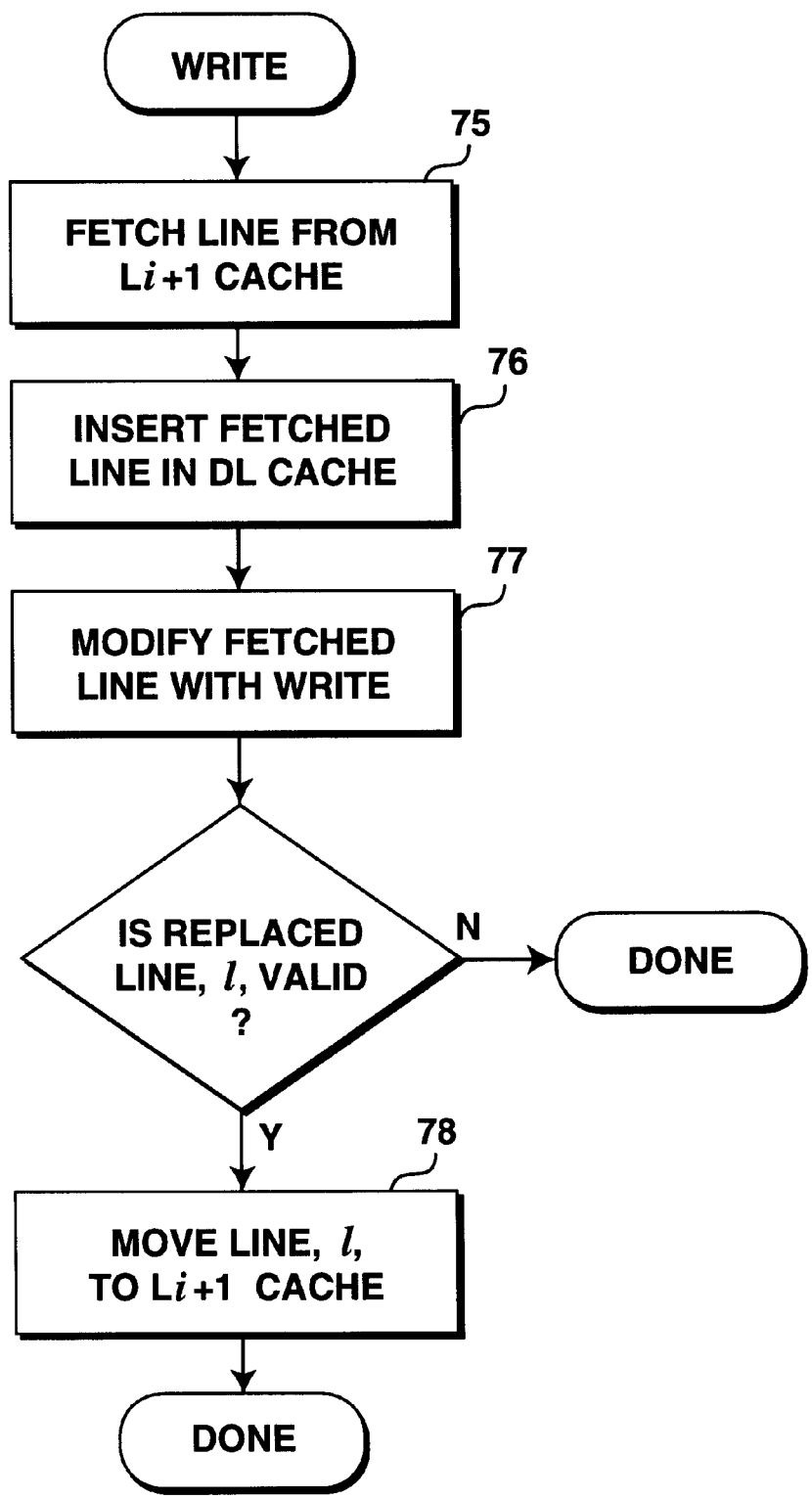
FIG. 9 shows a flow diagram for a write issued to an alternative write-through cache utilizing the dirty line cache of the present invention.

FIGS. 7–9 exemplify a computer system utilizing a write-through cache. It is appreciated that the write-through cache is different from the write-back cache, in that dirty cache lines cannot remain in the L1 cache. Again, the operation of write-back and write-through caches are known in the art. When a dirty line cache is utilized with the present invention, the write-through is achieved through the dirty line cache. However, it should be noted that the same data can exist and remain in the L1 cache, if the data is not dirty. For example, a processor issues a write to cache line C, which is then deposited in the DL cache. Then, the processor issues a read to cache line C. Line C will be copied to the write-through cache L1, resulting in both caches containing cache line C. However, the original write issued by the processor does not remain in the L1 cache, since the write-through protocol prohibits it.

In FIG. 7, a flow diagram 60 shows the operative sequence for a read being issued by the processor. If the appropriate cache line exists in the L1 cache and/or the DL cache, the data is sent to the processor (blocks 61 and 62). Again, both steps can be performed sequentially or simultaneously. If the required data is not present in either of the caches, the data is retrieved from a lower level of the hierarchy (block 63) and placed in the L1 cache (block 64). Since with a write-through cache no dirty lines can remain in the L1 cache, there is no concern of encountering a dirty line in the L1 cache.

In FIG. 8, a flow diagram 70 shows the operative sequence for a write operation. When a write is issued, the L1 line is checked for the presence of the appropriate data. If the appropriate cache line is present, the line is updated with the new information and sent to the DL cache (blocks 71a and b). A valid cache line being replaced in the DL cache by the modified line is propagated to a lower level of the hierarchy (block 72).

In the event the cache line does not exist in the L1 cache but does exist in the DL cache, the DL cache line is updated (block 74). If the cache line does not exist in either the L1 cache or the DL cache, a write is propagated to lower level(s) of the hierarchy until it is found (block 73). In this particular sequence, the write does not cause the data to be brought up the hierarchy.

FIG. 9 shows an alternative write sequence for block 73 of FIG. 8, if it is desirable to bring the data up the hierarchy when a write issues and the data is not present at the L1 level. Instead of issuing a write to a lower level as noted in block 73 of FIG. 8, the data is brought up from the lower level (block 75) and placed in the DL cache (block 76). The fetched line is then modified by the write update (block 77) and returned in the DL cache. If the replaced line in the DL cache contained valid data, then that line is moved down the hierarchy (block 78).

As noted in the above examples, the DL cache of the present invention can be implemented with either the write-back cache or the write-through cache systems. In either scheme, the modified cache lines are always written to the DL cache. However, the original write issued by the processor in this instance can cause the dirty cache line to be retained in the standard cache when the cache is a write-back cache. In the write-back cache, the dirty line can exist in either the main cache or the DL cache or in both. Note that once the data is propagated down the hierarchy, the dirty bit is cleared. The preferred technique is to implement the DL cache with a write-through cache for a more optimum cache performance.

Figure 10:
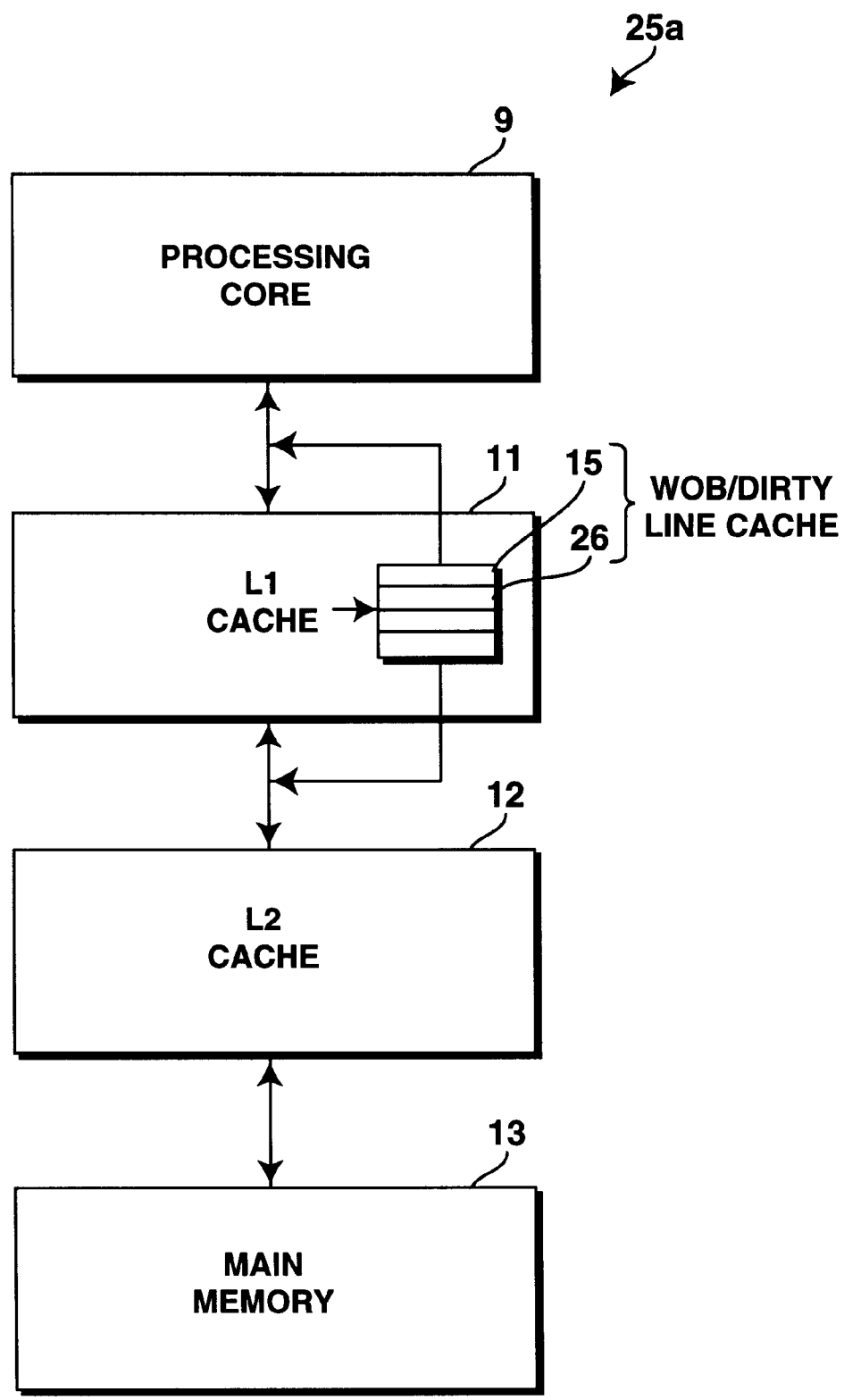
FIG. 10 shows a two-level cache memory using a dirty line cache of the present invention, but in which the dirty line cache is implemented as part of the write out buffer.

Referring to FIG. 10, the preferred technique for implementing a DL cache in a cache memory system is illustrated. A cache memory system 25a, which is equivalent to the system 25 of FIG. 3, is shown. The L1 cache utilizes the WOB 15, which was described in reference to FIG. 1. As noted earlier, the WOB 15 is a buffer for retaining those cache lines which have been modified and require further propagation down the hierarchy. Once the modified (dirty) lines of the L1 cache are written to the buffer, the L1 cache is free to resume its operation. The cache line in the buffer will be sent down the hierarchy as bus accesses are achieved.

The preferred embodiment utilizes this aspect of the WOB in order to implement the DL cache. In implementation, the WOB 15 is modified and adapted to operate as the DL cache 26. Since only dirty cache lines are sent to the WOB 15, it can operate as the DL cache. A significant advantage is derived by this scheme. Since the WOB already exists in the current write-back and write-through cache structures, a modification of the buffer allows it to perform as a DL cache. Essentially, a fully-associative supplemental cache-like structure can be achieved, without the addition of a complete separate cache structure, to operate in conjunction with the L1 cache. The improvement of providing a DL cache is achieved by altering the behavior of the existing WOB. Of course, a separate DL cache structure can be implemented, if so desired.

Figure 11:
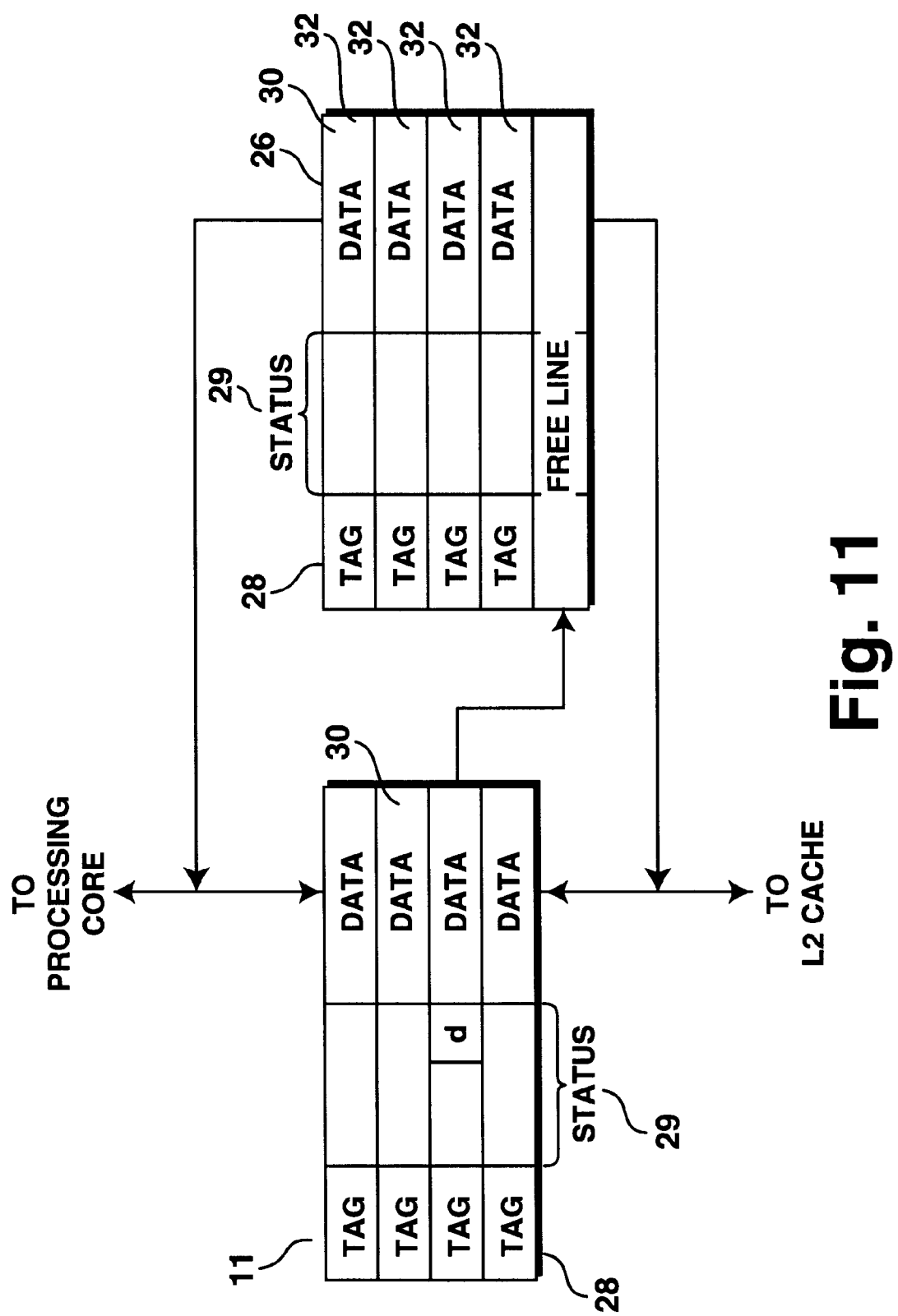
FIG. 11 shows a feature of the present invention in which an additional open cache line is used to improve caching of evicted cache lines from the main cache memory.

FIG. 11 illustrates an added feature of the DL cache of the present invention. In the use of cache memories, there are a number of known techniques for replacing existing cache lines. One of the more common used technique is the least recently used (LRU) replacement. That is, the least recently accessed cache line is removed from the cache if there is a new entry and if all of the cache line entries are full. Whatever the technique, caches utilize a replacement protocol to eject a line when a new line entry is required. However, some amount of time is needed to clear out an existing line before a new entry can be posted.

Assuming that a DL cache memory would be designed to operate with four cache line entries, the DL cache 26 of the present invention is designed to have an additional cache line which is kept empty. Thus, five cache lines 32 are shown in FIG. 11, where four are actually needed. The fifth line operates as an empty entry, so that a free (or open) cache line is available for a new cache line entry. When a dirty line enters into this open line, one of the four existing entries is ejected from the DL cache 26 by a given protocol, such as the LRU replacement protocol, and now becomes the open line for the next DL entry. Cache line storage time is improved since an open entry is avail for the new cache line entry.

Thus, a dirty line cache is described. The present invention decreases the utilization of the bus between the levels of cache and further increases the possibility that a read request can find its cache line in a cache closer to the processing core.

What is claimed is:

1. An apparatus for providing improved utilization of information transfer when caching information for a processor comprising:

a first memory arranged at a particular level of a cache hierarchy for caching information resident at a storage location accessed by said processor, said first memory having its cache line capable of being identified as containing modified data if said information is modified by said processor, wherein resulting in said modified information to be selected for propagation down said cache hierarchy to update said information in said storage location; and a second memory coupled to said first memory and functioning to supplement said first memory, said second memory for storing only modified data therein for propagation down said hierarchy, but in which said modified information once stored therein can also be accessed by said processor for performing a write of information resident at said storage location to said second memory.

2. The apparatus of claim 1 wherein said first memory is a direct-mapped memory or a low set-associative memory.

3. The apparatus of claim 2 wherein said second memory is a fully set-associative memory.

4. The apparatus of claim 3 wherein said first memory operates as a write-through cache memory.

5. The apparatus of claim 3 wherein said first memory operates as a write-back cache memory.

6. The apparatus of claim 5 wherein said second memory is structured as a buffer for propagating said modified data from said first memory, but also having said buffer accessed to retrieve said modified information stored therein as cached data.

7. A processor for providing improved utilization of information transfer when caching information from a main memory comprising:

a first cache memory arranged at a particular level of a cache hierarchy for caching information resident at a storage location when accessed from said main memory, said first cache memory having its cache line capable of being identified as containing modified data if said information is modified, wherein resulting in said modified information to be selected for propagation down said cache hierarchy to update information in said storage location; and a supplemental cache memory coupled to said first cache memory and functioning to supplement said first cache memory at said particular level of said hierarchy, said supplemental cache memory for storing only modified data therein for propagation down said hierarchy, but in which said modified information once stored therein can also be accessed along with data resident in said first cache memory by said processor for performing a write of information resident at said storage location to said supplemental cache memory.

8. The processor of claim 7 wherein said first cache memory is a direct-mapped memory or a low set-associative memory.

9. The processor of claim 8 wherein said supplemental cache memory is a fully set-associative memory.

10. The processor of claim 9 wherein said first cache memory operates as a write-through cache memory.

11. The processor of claim 9 wherein said first cache memory operates as a write-back cache memory.

12. The processor of claim 11 wherein said supplemental cache memory is structured as a buffer for propagating said modified data from said first cache memory, but also having said buffer accessed to retrieve said modified information stored therein as cached data.

13. A computer system for providing improved utilization of information transfer when caching information comprising:

a processor for processing information;

a main memory coupled to said processor;

a first cache memory arranged at a particular level of a cache hierarchy for caching information resident at a storage location of said main memory accessed by said processor, said first cache memory having its cache line capable of being identified as containing modified data if said information is modified by said processor, wherein resulting in said modified information to be selected for propagation down said cache hierarchy to update information in said storage location, said first cache memory coupled to said processor and said main memory; and a supplemental cache memory coupled to said first memory and functioning to supplement said first cache memory, said supplemental cache memory for storing only modified data therein for propagation down said hierarchy, but in which said modified information once stored therein can also be accessed by said processor for performing a write of information resident at said storage location to said supplemental cache memory, said supplemental cache memory also coupled to said processor and said main memory.

14. The computer system of claim 13 wherein said first cache memory is a direct-mapped memory or a low set-associative memory.

15. The computer system of claim 14 wherein said supplemental cache memory is a fully set-associative memory.

16. The computer system of claim 15 wherein said first cache memory operates as a write-through cache memory.

17. The computer system of claim 15 wherein said first cache memory operates as a write-back cache memory.

18. The computer system of claim 17 wherein said supplemental cache memory is structured as a buffer for propagating said modified data from said first cache memory, but also having said buffer accessed to retrieve said modified information stored therein as cached data.

19. A method for providing improved utilization of information transfer when caching information for a processor, comprising the steps of:

accessing data from a main memory;

storing said data in a first cache memory as cached data, otherwise storing said data in a supplemental cache memory if a write hit occurs in said supplemental cache memory;

marking said cached data in said first cache memory as modified data if said data has been modified by said processor;

copying said modified data into said supplemental cache memory coupled to said first memory, said supplemental cache memory functioning to supplement said first cache memory and for retaining only data which have been modified;

accessing said supplemental cache memory to read said modified data as cached data if said modified data no longer exists in said first cache memory;

propagating said modified data to a memory located lower on a cache hierarchy than said first cache memory, whether or not said modified data had been accessed as cached data for use by said processor.

20. The method of claim 19 further including the step of moving said modified data from said supplemental cache memory into said first cache memory when accessing said supplemental cache memory to read said modified data.

21. The method of claim 20 further including the step of moving a second modified data from said first cache memory to said supplemental cache memory when said second modified data is replaced by said modified data from said supplemental cache memory.

22. The method of claim 19 further including the steps of loading said first cache memory with a stored data from a memory located lower on a hierarchy than said first cache memory and moving a second modified data from said first cache memory to said supplemental cache memory when said stored data replaces said second modified data from said first cache memory.

* * * * *

UNITED STATES PATENT AND TRADEMARK OFFICE
CERTIFICATE OF CORRECTION

PATENT NO.   : 6,078,992
DATED        : June 20, 2000
INVENTOR(S)  : Hum

It is certified that error appears in the above-identified patent and that said Letters Patent is hereby corrected as shown below:

<u>Column 5,</u>
Line 19, delete "L1" and insert -- Li --.

Signed and Sealed this

Sixth Day of November, 2001

*Attest:*

*Attesting Officer*

NICHOLAS P. GODICI
*Acting Director of the United States Patent and Trademark Office*